(12) United States Patent
Lucas et al.

(10) Patent No.: US 7,660,668 B2
(45) Date of Patent: Feb. 9, 2010

(54) METHOD AND DEVICE FOR CONTROLLING AT LEAST ONE DECELERATION DEVICE AND/OR AN OUTPUT-DETERMINING ACTUATING ELEMENT OF A VEHICLE DRIVE DEVICE

(75) Inventors: Bernhard Lucas, Besigheim (DE);
Marcus Lorei, Braunschweig (DE);
Hermann Winner, Bietigheim (DE);
Martin Heinebrodt, Stuttgart (DE);
Ulrike Ahlrichs, Ingolstadt (DE)

(73) Assignee: Robert Bosch GmbH, Stuttgart (DE)

( * ) Notice: Subject to any disclaimer, the term of this patent is extended or adjusted under 35 U.S.C. 154(b) by 849 days.

(21) Appl. No.: 10/541,599

(22) PCT Filed: Oct. 21, 2003

(86) PCT No.: PCT/DE03/03483
§ 371 (c)(1),
(2), (4) Date: Jul. 6, 2005

(87) PCT Pub. No.: WO2004/079391
PCT Pub. Date: Sep. 16, 2004

(65) Prior Publication Data
US 2006/0155455 A1    Jul. 13, 2006

(30) Foreign Application Priority Data
Mar. 7, 2003    (DE) .................... 103 09 943

(51) Int. Cl.
*G06F 17/10*    (2006.01)
(52) U.S. Cl. .............. 701/301; 701/300; 340/436; 340/901; 340/902; 340/903; 342/42; 342/43; 342/52; 342/54; 342/55; 356/4.01; 356/27; 356/28

(58) Field of Classification Search .............. 701/300, 701/301; 342/72, 195, 42, 43, 52, 54, 55, 342/70, 71; 340/436, 901, 902, 903; 356/27, 356/28, 4.01
See application file for complete search history.

(56) References Cited
U.S. PATENT DOCUMENTS
5,369,591 A * 11/1994 Broxmeyer ................. 701/301
(Continued)

FOREIGN PATENT DOCUMENTS
DE    100 11 263    9/2001
(Continued)

OTHER PUBLICATIONS
Duffie et al., Distributed System-Level Control of Vehicles in a High-Performance Material Transfer System, 1995, IEEE, p. 212-217.*
(Continued)

*Primary Examiner*—Khoi Tran
*Assistant Examiner*—McDieunel Marc
(74) *Attorney, Agent, or Firm*—Kenyon & Kenyon LLP

(57) ABSTRACT

A device and a method for triggering at least one deceleration device and/or one output-determining actuator element of a vehicle propulsion system, in particular for automatic longitudinal vehicle regulation, a first surroundings sensing device being provided, which delivers longitudinal value-optimized measured values, a second surroundings sensing device being provided, which delivers object lateral dimension-optimized measuring values, and an analyzer device being provided, which receives the output signals of the first and second surroundings sensing devices and the measured values of the first and second surroundings sensing devices being used for object identification. The device and the method are furthermore suitable for initiating or performing vehicle deceleration for collision avoidance or for alleviating the severity of a collision.

11 Claims, 1 Drawing Sheet

U.S. PATENT DOCUMENTS

| | | | |
|---|---|---|---|
| 6,037,860 A | 3/2000 | Wiesner et al. | |
| 6,452,535 B1 | 9/2002 | Rao et al. | |
| 6,492,935 B1 | 12/2002 | Higuchi | |
| 7,164,117 B2 * | 1/2007 | Breed et al. | 250/221 |
| 7,243,945 B2 * | 7/2007 | Breed et al. | 280/735 |
| 7,407,029 B2 * | 8/2008 | Breed et al. | 180/274 |
| 7,415,126 B2 * | 8/2008 | Breed et al. | 382/100 |
| 2002/0126022 A1 | 9/2002 | Ellis | |
| 2003/0209893 A1 * | 11/2003 | Breed et al. | 280/735 |
| 2004/0129478 A1 * | 7/2004 | Breed et al. | 180/273 |
| 2005/0017488 A1 * | 1/2005 | Breed et al. | 280/735 |
| 2006/0208169 A1 * | 9/2006 | Breed et al. | 250/221 |

FOREIGN PATENT DOCUMENTS

| | | |
|---|---|---|
| GB | 2 373 117 | 9/2002 |
| WO | WO03/006290 | 1/2003 |
| WO | WO03/006291 | 1/2003 |
| WO | WO03/007271 | 1/2003 |

OTHER PUBLICATIONS

Kon, Vehicle Detectors, 1998, Internet, p. 1-42.*
RVD/SPC, Radar Vehicle Detector Specification, 2003, Internet, p. 1-8.*
Duffie et al., Distributed system-level control of vehicles in a high-performance material transfer system, 1995, IEEE, p. 212-217.*
Sasayama, T. "Technological Trends and Key Technologies In Intelligent Vehicles", IEICE Transactions on Electronics, Institute of Electronics Information and Comm. Eng. Tokyo, Japan, Bd. E76-C, Nr. 12, Dec. 1, 1993, pp. 1717-1726.
Olbrich, B. et al., "A Small, Light Radar Sensor and Control Unit for Adaptive Cruise Control", SAE-Paper 980607, SAE International Congress and Exposition, Detroit, Feb. 23, 1998.
Jähne, H. et al. "Handbook of Computer Vision and Applications: Motion," Academic Press, Boston, 2000, pp. 307-392.

* cited by examiner

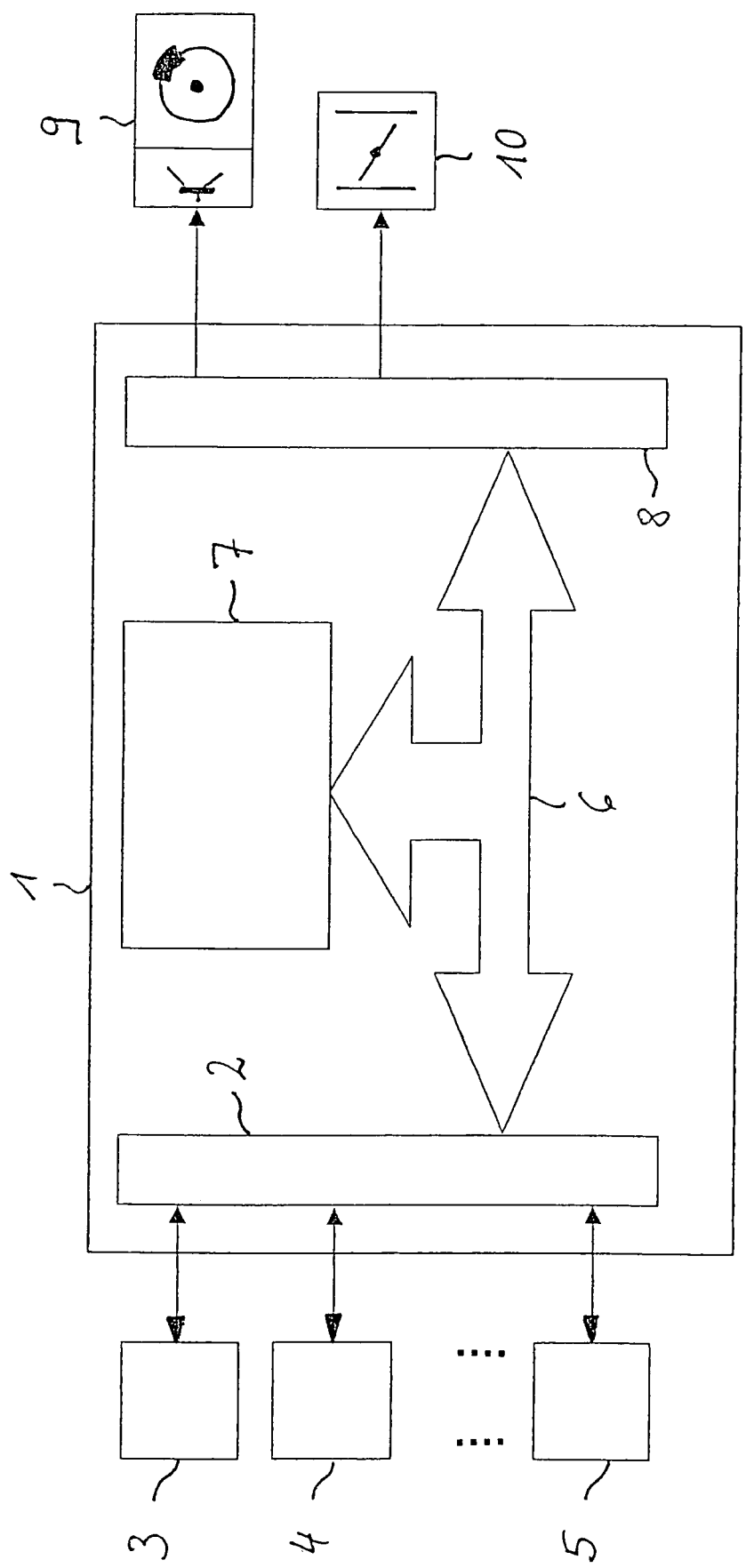
Figure

METHOD AND DEVICE FOR CONTROLLING AT LEAST ONE DECELERATION DEVICE AND/OR AN OUTPUT-DETERMINING ACTUATING ELEMENT OF A VEHICLE DRIVE DEVICE

FIELD OF THE INVENTION

The present invention relates to a device and a method for triggering at least one deceleration device and/or one output-determining actuator element of a vehicle propulsion system, in particular for automatic longitudinal vehicle regulation, a first surroundings sensing device being provided, which delivers longitudinal value-optimized measured values, a second surroundings sensing device being provided, which delivers object lateral extension-optimized measured values, and an analyzer device being provided, which receives the output signals of the first and second surroundings sensing devices and the measured values of the first and second surroundings sensing devices being used for object identification. The device and the method are furthermore suitable for initiating or performing vehicle deceleration for collision prevention or for alleviating the severity of a collision.

BACKGROUND INFORMATION

The publication "A Small, Light Radar Sensor and Control Unit for Adaptive Cruise Control" by Olbrich, Beez, Lucas, Mayer and Winter, SAE-Paper 980607, presented at the SAE International Congress and Exposition, Detroit, 23, Feb. 23-26, 1998, describes a motor vehicle radar sensor, which detects objects in the travel path of a vehicle and controls the vehicle deceleration devices or vehicle acceleration devices as a function of the detected objects. If the radar sensor detects no object or only detects objects which are not identified as vehicles traveling ahead, the vehicle velocity is regulated as constant velocity regulation. However, if the radar sensor detects objects which are identifiable as vehicles traveling ahead, the vehicle velocity is regulated as constant distance regulation. For this purpose, a three-beam microwave transceiver is used, which emits a frequency-modulated continuous-wave signal and receives reflected partial waves.

German Patent Application No. DE 100 11 263 A1 describes an object detection system, which is provided for vehicles in particular, in which the object detection system has a plurality of object detectors and/or operating modes for different detection ranges and/or detection areas. A radar sensor which has a relatively great detection range and a relatively small angular detection area in a first operating mode and a comparatively small detection range and increased angular detection area in a second operating mode is preferably used as the object detector. This system uses different surroundings sensing devices, each surroundings sensing system covering a different detection area.

In the book "Handbook of Computer Vision and Applications," Academic Press, Boston, 2000 by Jähne, Haußecker and Geißler, in the section "Motion" on pages 307 through 392, methods for processing moving images are described, in particular methods for determining and processing the "optical flow."

SUMMARY OF THE INVENTION

A core of the present invention is to provide a device and a method for triggering deceleration devices or output-determining actuator elements of vehicle propulsion systems in particular as automatic longitudinal vehicle regulation, the vehicle's surroundings being detected by surroundings sensing devices in such a way that the surroundings sensing devices complement one another, forming a redundant overall system.

The system according to the present invention advantageously provides for the measured values of the second surroundings sensing device to be used for verification and/or provision of additional information in analyzing the measured values of the first surroundings sensing device. This makes it possible to verify the measured values of the objects detected by the first surroundings sensing device via the measured values provided by the second surroundings sensing device, and additional information, such as the lateral object dimension, may optionally be assigned to the objects detected by the first surroundings sensing device. It is also possible to verify the measured values of the objects detected by the second surroundings sensing device via the measured values provided by the first surroundings sensing device, and additional information, such as the exact object distance or the azimuth angle of the object, may optionally be assigned to the objects recognized by the second surroundings sensing device.

It is furthermore advantageous that the measured values of the first surroundings sensing device are used for verification and/or for provision of additional information in analyzing the measured values of the second surroundings sensing device. This makes it possible to verify the measured values of the objects detected by the second surroundings sensing device via the measured values provided by the first surroundings sensing device and additional information, such as the exact object distance, may optionally be assigned to the objects detected by the second surroundings sensing device.

The measured values of the first surroundings sensing device may be advantageously used for reducing the complexity of the signal processing in the second surroundings sensing device, in particular for limiting the analysis of certain regions of the detection area of the second surroundings sensing device.

The system advantageously provides for automatic vehicle deceleration to be triggered and/or performed for longitudinal vehicle regulation to avoid a collision and/or to alleviate the severity of a collision. Automatic vehicle deceleration is triggered or performed as a function of the objects detected by the surroundings sensing devices in the detection area of the surroundings sensing devices.

It is furthermore advantageous that the first surroundings sensing device is a radar transceiver device. Radar transceiver devices offer the advantage that their operability is independent of weather conditions, and that they permit distances and relative velocities of the recognized objects to be determined very accurately.

It is furthermore advantageous that the first surroundings sensing device is a radar transceiver device. Lidar systems emit coherent, monochromatic light and receive the reflected partial waves. Lidar systems make it possible to determine the distance and relative velocity of detected objects very accurately. If the lidar system is designed as a scanning lidar system, it is also possible to determine the lateral dimension of the object.

The second surroundings sensing device is advantageously designed as an image detection system. This image detection system may be advantageously designed as a monocular video camera or as a stereo video camera. Providing a monocular video camera makes the cost-effective implementation of the device according to the present invention possible. Providing a stereo video camera makes reliable, three-dimensional analysis of the recorded stereo image pairs possible.

The implementation of the method according to the present invention in the form of a control element which is provided for a control unit of an adaptive cruise control system of a motor vehicle is of particular importance. A program which is suitable for being run on a computer, on a microprocessor in particular, and for carrying out the method according to the present invention is stored in the control element.

Therefore, in this case, the present invention is implemented by a program stored in a control element, so that this control element provided with the program represents the present invention, as does the method which the program is suitable for carrying out. In particular, electrical memory media, a read-only memory for example, may be used as a control element.

BRIEF DESCRIPTION OF THE DRAWING

The FIGURE shows a schematic representation of the device according to the present invention.

DETAILED DESCRIPTION

The FIGURE shows a processing device 1 which receives input signals. These input signals are supplied to processing device 1 via an input circuit 2 and further processed. The input signals originate from a first surroundings sensing device 3, a second surroundings sensing device 4, and further, optionally providable input variable devices 5. These optional input variable devices 5 may include driver-actuatable operating elements for controlling processing device 1, for example, in the form of switches, buttons, a gas pedal switch, or gas pedal potentiometer, or a brake pedal switch or brake pedal potentiometer; input variable devices 5 may also be sensors, for example, velocity sensors or acceleration sensors which relay the measured variables to processing device 1. First surroundings sensing device 3 is a surroundings sensing device which provides longitudinal value-optimized measured values. Longitudinal value-optimized measured values are understood as measured values originating from a surroundings sensing device, capable of determining distances or relative velocities to detected objects very accurately, but are ill-suited or unsuitable for determining the lateral dimensions of objects. A surroundings sensing device which provides longitudinal value-optimized measured values is understood as a radar transceiver, for example, capable of very accurately determining distances between the transmitter and the receiver, i.e., the distance in the direction of propagation of the waves. In addition to, or instead of, this radar system, a lidar transceiver may also be provided, which also delivers longitudinal value-optimized measured values.

Furthermore, a second surroundings sensing device 4 transmits measured values to processing device 1. According to the present invention, this second surroundings sensing device 4 is a device which provides object lateral extension-optimized measured values. A surroundings sensing device providing object lateral extension-optimized measured values is understood as a device capable of accurately determining the dimension of the detected objects perpendicular to the direction of propagation of the measuring waves used. The use of an image detection system, designed either as a monocular video camera or as a stereo video camera, is provided as second surroundings sensing device 4 which provides object lateral extension-optimized measured values. Such image detection systems are capable of determining the dimensions of the detected objects perpendicular to the direction of propagation of the measuring waves; however, these systems have the disadvantage of determining distances in the direction of propagation of the measuring waves very inaccurately or not at all.

These input variables which are supplied to processing device 1 via input circuit 2 are supplied to a computing device 7 via a data exchange device 6, which may be designed as a bus system, for example. The measured values provided by first and second surroundings sensing devices 3, 4 are analyzed in computing device 7. For this purpose, the objects detected by first surroundings sensing device 3 are superimposed on those detected by second surroundings sensing device 4 and thus the objects detected by both surroundings sensing devices 3, 4, are accurately detected with respect to distance, relative velocity and lateral dimension. As a result of such a combination of the object measurement results detected by both longitudinal value-optimized and object lateral dimension-optimized surroundings sensing devices 3, 4, accurate measured values are obtained and redundancy regarding objects which are highly relevant with respect to the driving safety of the automatic longitudinal vehicle regulation is achieved. In particular, when an automatic emergency braking function is provided in which automatic vehicle deceleration is triggered and/or performed for collision avoidance and/or for alleviating the severity of the collision, it is necessary that the detected objects be reliably detectable and the distances and lateral dimensions of the objects be accurately measurable. The remaining time to a possible collision with a vehicle traveling ahead is accurately computable from the data of first surroundings sensing device 3, which provides longitudinal value-optimized measured values.

To evaluate the data of second surroundings sensing device 4, which may be designed as a cost-effective, monocular video camera, for example, accurate values of the object dimensions may be obtained via optical flow algorithms, which are known from the related art, and the known distance and velocity information provided by first surroundings sensing device 3. It is important both for the correct consideration of all avoidance options available to the driver when automatic emergency braking is triggered and for automatically triggered and automatically performed avoidance maneuvers of the vehicle equipped with the system of the present invention to know the lateral dimensions of objects in the vehicle's path which are relevant with regard to safety. First and second surroundings sensing devices 3, 4 should be selected in such a way that second surroundings sensing device 4 is capable of delivering accurate values of the object data which first surroundings sensing device 3 is incapable of delivering or delivers inaccurately due to system limitations. Furthermore, first surroundings sensing device 3 must be capable of accurately and reliably delivering object data which second surroundings sensing device 4 is incapable of delivering or delivers inaccurately due to system limitations. For example, providing a radar device as first surroundings sensing device 3 and a cost-effective, monocular image detection system as second surroundings sensing device 4 is a preferred embodiment, because a radar system and monocular video camera ideally complement one another regarding the accuracy of object data deliverable under consideration of the limitations of both systems.

It is also possible to evaluate the measured values of the longitudinal value-optimized surroundings sensing device in a first analyzer device and the measured values of the lateral dimension-optimized surroundings sensing device in a second analyzer device. The measured values of the second, i.e., lateral dimension-optimized surroundings sensing device may also be relayed to the analyzer device provided for longitudinal value-optimized analysis, where the longitudinal value-optimized measured values may be verified using the additionally provided lateral dimension-optimized measured values and/or further object-specific information may be assigned to the detected objects. For example, another value regarding the lateral dimension of the object may be assigned to the objects detected by a radar system, which is impossible or difficult to do using a pure radar system, or the signal processing of the radar system may be simplified by limiting the range of analysis to areas where objects have been detected by a video system.

Measured values of the longitudinal value-optimized surroundings sensing device may be additionally supplied to the analyzer device for the lateral dimension-optimized measured values. This makes verification of the lateral dimension-optimized measured values and provision of further information possible. Knowing the exact object distance, which is very accurately determinable using a radar system, a scaling factor of the lateral dimension-optimized image detection system may be properly determined or, knowing the direction and distance in which the radar system has detected an object, the image processing may be limited to certain image areas of the video detection area to save processing time.

It is furthermore conceivable to implement both analyzer devices for longitudinal value-optimized and lateral dimension-optimized measured values in a single analyzer device, the lateral dimension-optimized measured values being additionally supplied to the analysis algorithm for processing the longitudinal value-optimized measured values, and the longitudinal value-optimized measured values being supplied to the algorithm for processing the lateral dimension-optimized measured values to verify the measured values or to obtain additional information, for example, which is impossible to obtain due to system limitations.

On the basis of the determined objects and their movement-specific object data, actuating signals for deceleration devices and acceleration devices of the vehicle are formed in computing device 7 and are supplied to an output circuit 8 via data exchange system 6. Output circuit 8 outputs actuating signals to deceleration devices 9 of the vehicle which provide electronically controlled brake activation, for example, and are capable of decelerating the vehicle as a function of the detected objects. An actuating signal is also supplied via output circuit 8 to an output-determining actuator element of a propulsion system 10, which may be an electrically controlled throttle valve, for example, or an electrically controlled fuel metering device for an injection system. It is also conceivable for computing device 7 to deliver output signals which activate an electrically controlled steering system via data exchange system 6 and output circuit 8 and are capable of steering the vehicle as a function of the detected objects which are relevant with regard to safety and are capable of performing an avoidance maneuver in the event of an imminent collision with an object traveling ahead.

What is claimed is:

1. A device for triggering at least one of (1) at least one deceleration device and (2) at least one output-determining actuator element of a vehicle propulsion system, the device comprising:
    a first surroundings sensing device for providing longitudinal value-optimized measured values;
    a second surroundings sensing device for providing object lateral extension-optimized measured values; and
    an analyzer device for receiving output signals of the first and second surroundings sensing devices, and for using the measured values of both the first and second surroundings sensing devices for at least one of (a) object identification and (b) triggering of at least one of (1) the at least one deceleration device and (2) the at least one output-determining actuator element of the propulsion system;
    wherein one of: (a) the measured values of the second surroundings sensing device are used for at least one of verification and provision of additional information in analyzing the measured values of the first surroundings sensing device; and (b) the measured values of the first surroundings sensing device are used for at least one of verification and provision of additional information in analyzing the measured values of the second surroundings sensing device.

2. The device according to claim 1, wherein the device is for at least one of an automatic longitudinal vehicle regulation and an object identification.

3. The device according to claim 2, wherein the longitudinal vehicle regulation provides for automatic vehicle deceleration to be at least one of triggered and performed to at least one of: avoid a collision and alleviate a severity of a collision.

4. The device according to claim 1, wherein the first surroundings sensing device is a radar transceiver device.

5. The device according to claim 1, wherein the first surroundings sensing device is a lidar transceiver device.

6. The device according to claim 1, wherein the second surroundings sensing device is an image detection system.

7. The device according to claim 6, wherein the image detection system includes a monocular video camera.

8. The device according to claim 6, wherein the image detection system includes a stereo video camera.

9. A method for triggering at least one of (1) at least one deceleration device and (2) at least one output-determining actuator element of a vehicle propulsion system, the method comprising:
    receiving in an analyzer device output signals of a first surroundings sensing device and a second surroundings sensing device, the first surroundings sensing device providing longitudinal value-optimized measured values, and the second surroundings sensing device providing object lateral extension-optimized measured values;
    using the measured values of both the first and second surroundings sensing devices for object identification, wherein one of: (a) the measured values of the second surroundings sensing device are used for at least one of verification and provision of additional information in analyzing the measured values of the first surroundings sensing device; and (b) the measured values of the first surroundings sensing device are used for at least one of verification and provision of additional information in analyzing the measured values of the second surroundings sensing device; and
    activating at least one of (1) at least one deceleration device and (2) at least one output-determining actuator element of the propulsion system as a function of a determined surroundings situation.

10. The method according to claim 9, wherein the method is for automatic longitudinal vehicle regulation.

11. The method according to claim 10, wherein the longitudinal vehicle regulation provides for automatic vehicle deceleration to be at least one of triggered and performed to at least one of: avoid a collision and alleviate a severity of a collision.

* * * * *

UNITED STATES PATENT AND TRADEMARK OFFICE
CERTIFICATE OF CORRECTION

PATENT NO. : 7,660,668 B2 Page 1 of 1
APPLICATION NO. : 10/541599
DATED : February 9, 2010
INVENTOR(S) : Lucas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1208 days.

Signed and Sealed this

Thirtieth Day of November, 2010

David J. Kappos
*Director of the United States Patent and Trademark Office*